US011485680B2

(12) United States Patent
Ferreira et al.

(10) Patent No.: US 11,485,680 B2
(45) Date of Patent: Nov. 1, 2022

(54) MANUFACTURING PROCESS OF POZZOLAN WITH COLOR CHANGE AND POZZOLAN THUS OBTAINED

(71) Applicant: DYNAMIS ENGENHARIA E COMÉRCIO LTDA., São Paulo (BR)

(72) Inventors: Guilherme Martins Ferreira, São Paulo (BR); Luis Filipe Von Rainer Fabiani, São Paulo (BR); Luiz Felipe De Pinho, São Paulo (BR); Rodrigo De Souza Borges, São Paulo (BR)

(73) Assignee: DYNAMIS ENGENHARIA E COMÉRCIO LTDA., São Paulo (BR)

( * ) Notice: Subject to any disclaimer, the term of this patent is extended or adjusted under 35 U.S.C. 154(b) by 599 days.

(21) Appl. No.: 16/605,603

(22) PCT Filed: Apr. 23, 2018

(86) PCT No.: PCT/BR2018/050120
§ 371 (c)(1),
(2) Date: Oct. 16, 2019

(87) PCT Pub. No.: WO2018/195624
PCT Pub. Date: Nov. 1, 2018

(65) Prior Publication Data
US 2020/0131087 A1 Apr. 30, 2020

(30) Foreign Application Priority Data

Apr. 26, 2017 (BR) .................... BR1020170086356
Mar. 28, 2018 (BR) .................... BR1020180063324

(51) Int. Cl.
C04B 7/13 (2006.01)
C04B 7/44 (2006.01)
C04B 7/47 (2006.01)

(52) U.S. Cl.
CPC ................. *C04B 7/13* (2013.01); *C04B 7/44* (2013.01); *C04B 7/4415* (2013.01); *C04B 7/47* (2013.01)

(58) Field of Classification Search
CPC .... C04B 7/12; C04B 7/13; C04B 7/43; C04B 7/44; C04B 7/4415; C04B 7/47; C04B 14/06; C04B 20/04; C04B 20/061; C04B 20/065; C04B 28/18; C04B 2103/00878; C04B 2111/80
See application file for complete search history.

(56) References Cited

U.S. PATENT DOCUMENTS 8,906,155 B2 * 12/2014 Gasafi .................... C04B 28/04
501/141
2012/0145042 A1 6/2012 Ballan et al.
2012/0160135 A1 6/2012 Ballan et al.
2014/0000491 A1 1/2014 Gasafi et al.
2016/0304395 A1 10/2016 Rohloff et al.

FOREIGN PATENT DOCUMENTS

BR       PI 1002450-6        5/2012

OTHER PUBLICATIONS

PCT/BR2018/050120; PCT International Search Report and Written Opinion of the International Searching Authority dated Oct. 19, 2018.
Almenares, RS et al.; "Industrial calcination of kaolinitic clays to make reactive pozzolans"; Case Studies in Construction Materials, 6 (2017) 225-232, available online Apr. 4, 2017; p. 225, abstract; p. 227, section 3, first paragraph.

* cited by examiner

*Primary Examiner* — Anthony J Green
(74) *Attorney, Agent, or Firm* — Renner, Otto, Boisselle & Sklar, LLP

(57) ABSTRACT

The present invention refers to a manufacturing process of artificial pozzolan which has the final color gray. In order to perform the processes in the desired way, the kiln atmosphere shall contain low oxygen concentration and the presence of reducing agents. However the presence of carbon monoxide at the kiln outlet is not desirable, due to environmental impacts and the increase in specific heat consumption of the kiln. So the process described in this invention comprises the following steps: heating (1), which consists of heating the raw materials to a temperature between 100-350° C. until drying of the material to a moisture mass fraction of 0-5% (wet basis); mixing (2), which consists of mixing the dry raw materials from the heating process with the right proportion of fuel, in from 1% to 5% in mass fraction, according to the concentration of hematite present in the raw material; calcining (3), which consists of heating the fuel and raw materials blend to a temperature between 700-900° C., with oxygen concentration between 1-5% and, finally, cooling (4), which consists of an initial step of rapid decrease in pozzolan temperature until 600° C. and a final step of slow decrease in pozzolan temperature until 120° C.

11 Claims, 2 Drawing Sheets

MANUFACTURING PROCESS OF POZZOLAN WITH COLOR CHANGE AND POZZOLAN THUS OBTAINED

The present application is a U.S. National Stage Application based on and claiming benefit and priority under 35 U.S.C. § 371 of International Application No. PCT/BR2018/050120, filed 23 Apr. 2018, which in turn claims benefit of and priority to Brazilian Application No. BR 10 2017 008635 6, filed 26 Apr. 2017, and Brazilian Application No. BR 10 2018 006332 4, filed 28 Mar. 2018, the entirety of each of which is hereby incorporated herein by reference.

The present invention refers to a manufacturing process of artificial pozzolan which has the final color gray, with the particularity of a controlled atmosphere during the pozzolan activation process.

STATE OF THE ART

The use of pozzolanic material as a substitute for clinker in the cement manufacturing is of great interest among the industries of cement, concrete and grout due to the following reasons:

Pozzolan has a lower cost of production than clinker;
Pozzolan production has lower $CO_2$ rate of emission than clinker production;
There is a great availability of clay material for pozzolan production;
The addition of pozzolan to the cement reduces the heat of hydration of the mixture, which in turn reduces the expansion of large concrete blocks, avoiding cracks.

Currently there are many ways to produce artificial pozzolan through the thermal activation of clays in a kiln. The already known techniques for clay activation are summarized below.

The document BRPI 1002450-6 refers to a manufacturing process of artificial pozzolan, activated through the calcination of clay in a horizontal kiln, with addition of a solid fuel in temperatures between 300-900° C. Inside the kiln there shall be a reducing atmosphere, with carbon monoxide (CO) levels varying between 0.5-3% and residence time of material varying between 40-70 minutes. Cooling process shall be performed with counterflow air or at room temperature. The described process tends to reduce or eliminate the reddish color of pozzolan for brown or gray colors. The described process occurs in a reducing atmosphere with 0.5-3% of carbon monoxide, which indicates that there will be CO in the kiln exhaust gases composition. There are no details regarding the cooling process and the consequences of it to the final color of the material. The description does not mention any control over the exact final color of the product.

The document BRPI 020453-9 refers to a manufacturing process of artificial pozzolan, activated through calcination of a mixture of kaolinitic clay and limestone under temperatures between 600-1000° C. The described process does not provide information on which type of kiln or furnace is used for clay calcination and neither provides information regarding the cooling process of the material. There is no specification on what type of cooler is used, nor the required atmosphere composition inside the cooler, nor the necessity of any additional cooling agent. The described process does not specify whether there is any control over the final color of the material.

The document BRPI 1004045-5 refers to a process to control the calcination of clay inside a rotating horizontal kiln, under reducing atmosphere, with or without addition of solid fuel. Cooling process may be performed with or without direct application of water. The final product may be found in three distinct colors, according to the chosen processes: (1) rose coloration, if there is no addition of solid fuel during calcination of clay and no injection of water during refrigeration; (2) light gray color, if there is addition of a small amount of solid fuel during calcination of clay and no use of water during refrigeration process; (3) dark gray color, if there is addition of a high amount of solid fuel during calcination of clay and injection of water during the refrigeration process. The described process is able to generate grayish colored pozzolan only under the addition of solid fuel to the calcination phase, which means that carbon monoxide will be in the kiln exhaust gases composition. Besides, refrigeration phase makes use of water directly over the material.

The document WO 2012/126696 refers to a manufacturing process of a clinker substitute in the cement production that can replace 10-40% of clinker in cement composition. The referred material is made of clay with an iron mass fraction higher than 1.5% (wet basis) and a kaolinite mass fraction lower than 40% (wet basis). Clay calcination shall be performed in a fluidized bed kiln or in a rotating kiln or in an upward calciner or in a cyclone tower, under reducing atmosphere, with exhaust gases and under temperatures between 600-1000° C. Cooling process shall be performed until the temperature is below 300° C., with addition of a liquid fuel (usually oil), which is gasified during the contact with the hot material and generates carbon monoxide (CO), contributing to the maintenance of a reducing atmosphere. Final material shall contain more than 90% of magnetite—$Fe_3O_4$—mass fraction (wet basis), more than 0.1% of CaO mass fraction and no amount of hematite—$Fe_2O_3$. Final color of the material shall be gray. The described process makes use of a liquid fuel (oil) over the hot material in order to maintain the reducing atmosphere during cooling process. This solution leads to a more complex system (tank, pumps, valves) and usually the result is a more expensive operation, due to the higher price of the fuel-oil.

The document US 2012/0160135 refers to the manufacturing of artificial pozzolan through heat treatment of raw alumina. Resulting material presents light gray or white color. The heating process shall be performed in a rotating kiln or an upward calciner, with addition of liquid fuel (oil) under clay activation temperature (between 700-850° C.). Cooling process shall be performed under reducing atmosphere with addition of liquid fuel (oil) or a water spray over the hot material, until pozzolan color stabilization temperature is reached (between 180-400° C.). An amount of the generated synthetic pozzolan is recirculated back to the heating process in the rotating kiln or the calciner. The described process accounts with addition of liquid fuel during the cooling process and also the direct use of water over the hot material.

The document US 2016/0304395 refers to the manufacturing of pozzolanic material to be used as a substitute for clinker in the cement composition. The methodology is based on the calcination of a mixture containing clay and solid fuel (coal) or a mixture of clay and ashes. Heating process shall be performed in a rotating kiln or a fluidized bed kiln or a heating tower or a pneumatic suspension heat exchanger. Heating temperatures shall be preferentially between 700-900° C. The hot material cooling shall be performed in a rotating cooler or a grate cooler or a fluidized bed refrigerator or a vertical cooler or a screw refrigerator. The described process does not supply details with respect to the cooling process.

An important point must be highlighted regarding the presence of carbon monoxide (CO) at the outlet of a chemical process. Carbon monoxide is a toxic and pollutant gas that can cause the death of people who inhale it for an extended period of time. For this reason the environmental agencies demand the CO emission control to be performed in all industrial processes, especially the ones which burn fossil fuels, where the presence of this gas is more likely.

The use of water for direct refrigeration of the active pozzolan (for example, using a water spray over the hot material) has a negative effect of raising the heat consumption of the process. Water vapor is generated inside the cooler and sucked into the kiln, raising the kiln flow of exhaust gases and, consequently, raising the thermal losses of the process. This is what characterizes the raising in the kiln heat consumption.

Besides the inefficiency of the existing pozzolan manufacturing processes, the large scale use of it still faces a resistance from the market due to the reddish color of pozzolans with high iron content.

Although the color has no influence over pozzolan's resistance properties, reddish cements are not well accepted in the civil construction market, because the red color is associated with the addition of soil to the cement, which would result in a low-quality material. Currently there is still no technology that is economically and energetically efficient for the activation of high iron content clays with grayish good quality pozzolan as a result.

OBJECTS OF THE INVENTION

First aim of the present invention is an improved manufacturing process of pozzolan based cements.

Second aim of the present invention is an innovative manufacturing process of pozzolan, which allows controlled changes in the final product color.

Third aim of the present invention is an improved and environmental friendly manufacturing process of pozzolan based cement, with no presence of carbon monoxide (CO) at the outlet of the kiln.

Another aims of the present invention will be mapped out in the brief report and in the description of a preferential way of making the invention.

SUMMARY OF THE INVENTION

The process of this invention consists of manufacturing active clay and obtaining grayish pozzolan from white, yellow or reddish clays and other raw materials. Activation process shall be performed in a rotating kiln or a flash calciner or a fluidized bed kiln. In order to perform the activation and color changing processes in the desired way, the kiln atmosphere must present a low oxygen concentration (between 1-5%), without allowing carbon monoxide (CO) at kiln exhaust gases.

Thus, more particularly, the present invention refers to a manufacturing process of pozzolan with color change, which comprises the following steps:

Heating: consists of heating the raw materials to a temperature between 100-350° C. until the drying of material leads to 0-5% of moisture.

Mixing: consists of mixing the dry raw materials originated in the heating step, in a proportion of 1-5% fuel mass fraction, according to the hematite content in the raw materials.

Calcination: consists of heating a mixture of fuel and dry raw materials to a temperature between 700-900° C., under a concentration of oxygen between 1-5%.

Cooling: consists of a first step of rapid temperature decrease until 600° C. and a second step of slow temperature decrease until 120° C.

Furthermore, the process described in this invention is particularly defined by claims 2 to 11.

At last, the present invention regards to a pozzolan that is manufactured through the processes of claims 1 to 11.

BRIEF DESCRIPTION OF THE DRAWINGS

The present invention will be better understood with a detailed description of a preferential way (but not the only one) for the invention, which makes use of the attached illustrations that shall not be restrictive.

Illustration 1 contains a diagram of pozzolan manufacturing steps according to the present invention, with addition of solid fuel after the heating step.

Figure 1:
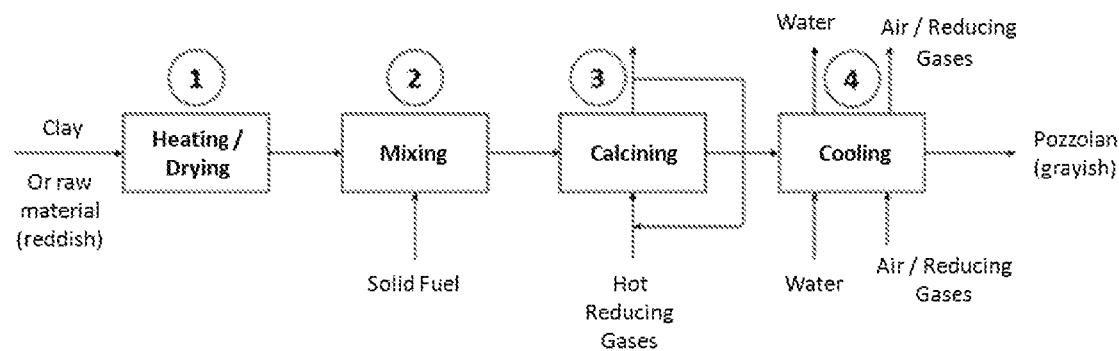
Figure 2:
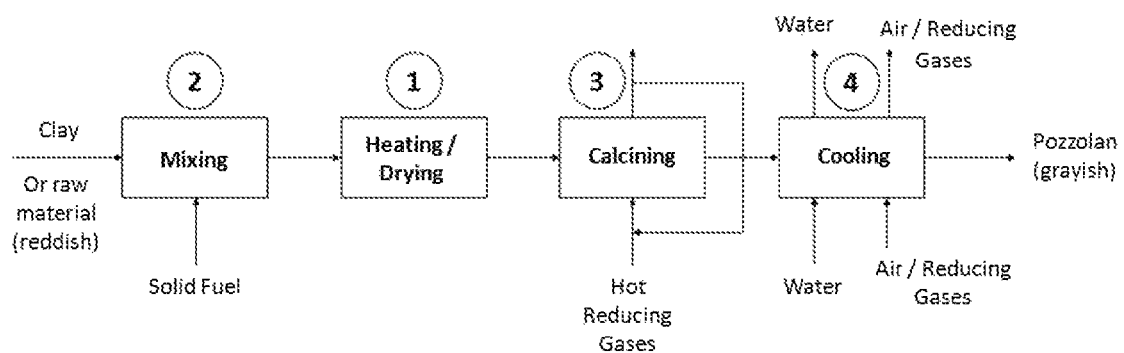
Figure 3:
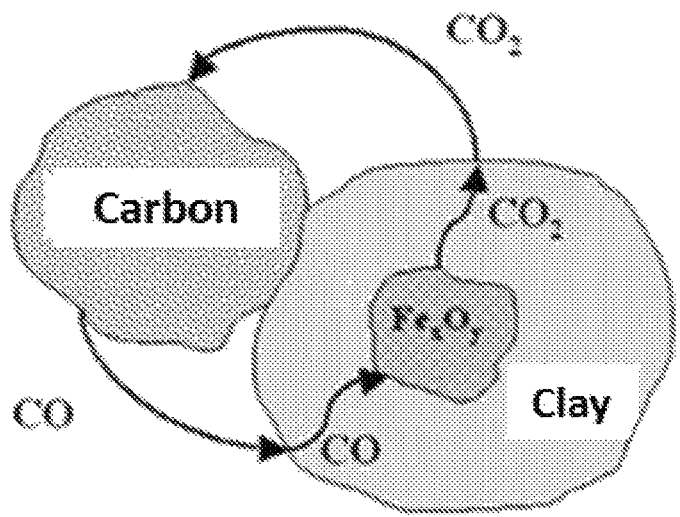
Figure 4:
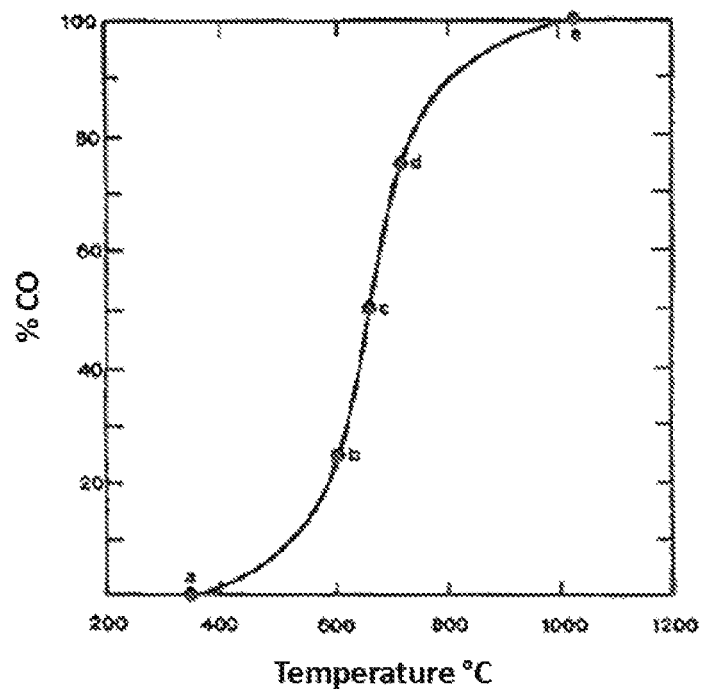

Illustration 2 contains a diagram of pozzolan manufacturing steps according to the present invention, with addition of solid fuel before the heating step.

Illustration 3 contains a diagram of reducing reactions of hematite ($Fe_2O_3$) to magnetite ($Fe_3O_4$) according to the amount of solid fuel blended with the material.

Illustration 4 contains the Boudouard reaction chart.

PREFERRED EMBODIMENT OF THE INVENTION

The process described in the present invention aims to get grayish active pozzolan that can partially substitute the components of cement, enhancing or keeping cement resistance properties, with no change in the original cement color, finally keeping cement's commercial value. Moreover, the process of this invention is particularly important from environmental point of view, since it eliminates carbon monoxide from the kiln exhaust gases.

Carbon monoxide (CO) emission through exhaust gases to atmosphere after the activation process of clay is not acceptable. There are some clay activation processes described in the State of the Art section that present 0.5-3% (5000-30000 ppmv) of carbon monoxide inside kiln atmosphere, for example BRPI 1002450-6. Besides not presenting any estimation for the fraction of CO inside the kiln or inside the cooler or at stack, the inventions from documents BRPI 1004045, WO 2012/126696 and US 2012/0160135 all use another fuel (lighter, like fuel oil) to keep a reduction atmosphere during the cooling process.

Environmental agencies are responsible for delimiting the maximum allowed emission of carbon monoxide by industrial processes. Brazilian National Council for Environment (CONAMA), for example, describes the "Standards for Air Quality" in the resolution 03/90, which states the air pollutant concentrations that can affect health, safety and well being of local population as well as cause damage to fauna and flora, to materials and general environment. This resolution states for carbon monoxide that an average concentration during 8 hours of 10000 μg per cubic meter of air (9 ppm) shall not be exceeded more than once a year. It also states that an average concentration during 1 hour of 40000 μg per cubic meter of air (35 ppm) shall not be exceeded more than once a year. Another resolution from CONAMA is the 264/99, which refers to the licensing of clinker rotating kilns that co-process residues. It states a maximum carbon monoxide emission of 100 ppmv at 7% oxygen. A process that allows carbon monoxide emission between 5000-30000 ppmv shall not be considered environmentally safe. Thus, in order to make clay activation process environmentally safe, carbon monoxide shall be eliminated from the exhaust gases composition.

In industry the most common way to mitigate CO from flue gases is by burning it in presence of air. This burnout leads to an increase in gas temperature due to energy released from the combustion process. The increase in temperature of the exhaust gases represents a waste of energy and results in an increase of specific heat consumption of the kiln. That said, one cannot state that a pozzolan manufacturing process that eliminates carbon monoxide by means of increasing flue gases temperature is the most efficient. Thus the presence of carbon monoxide (CO) at the kiln outlet is not desirable, whether because of environmental impacts or the increase in specific heat consumption of the kiln.

The method of the present invention consists of the following steps: 1) heating; 2) mixing; 3) calcination and 4) cooling.

In "step 1" the kiln is fed with raw materials that contain 0-50% of moisture. These materials are heated inside the kiln. Heating process can be done in a slow way, as it happens in a rotary kiln (in which the residence time is around one hour), or it can be done in a fast way, as it happens in a fluidized bed or flash calciner (in which the residence time is just a few seconds). Heating process continues until the temperature reaches 100-350° C., allowing the drying of the material to 0-5% of moisture. During this step there is still no concern about oxygen concentration, because oxidation of the material is not significant at this temperature range.

In "step 2" hot raw materials are mixed with a solid fuel, in a proportion of 1-5% of fuel (weight fraction) according to the level of hematite in the raw material composition. When the inputs exhibit a high content of hematite ($Fe_2O_3$) they show the red color, which is intensified during calcination, because of the high temperature that facilitates iron oxidation reaction. Granularity of the mixed fuel shall be close to the raw material granularity. The solid raw materials that can be applied in this case are: coal, charcoal, petroleum coke, biomass or other carbon rich waste. The solid fuel is necessary because the iron oxide contained in the raw material demands the presence of carbon to reduce to magnetite. This chemical reduction takes place when the mixture of clay and solid fuel reaches a temperature around 600° C. Below this temperature the generation of CO, which is controlled by Boudouard mechanism ($C+CO_2 \rightarrow 2CO$), reaches a minimum kinetic rate that triggers the process. Illustration 3 contains a diagram of reducing reactions of hematite ($Fe_2O_3$) to magnetite ($Fe_3O_4$) according to the amount of solid fuel blended with the material. Illustration 4 contains the Boudouard reaction chart. The graph shows that there is almost no formation of carbon monoxide until the temperature of 500° C. CO generation becomes more expressive after 600° C., favoring the reducing process of hematite.

In "step 3" the activation of the raw material takes place. Water is released from the crystalline structure of the raw material and the reduction of hematite leads to a change in pozzolan color. The water release leads to an amorphous structure that activates the raw material. Clay activation takes place between 700-900° C., when crystallized water is removed, causing a destruction in the crystalline structure of the material, providing pozzolan with hydraulic activity. (Hydraulic activity is the reactivity of aluminum or silicon oxide contained in pozzolan with calcium oxides from clinker or lime). Thus the temperature for clay calcining can vary from 700° C. to 900° C., according to its mineralogical composition. Still during this step, it occurs the color change of the raw material, from reddish to grayish. The hematite ($Fe_2O_3$) contained in Clay reacts with the reducing atmosphere, preferably with carbon monoxide, and turns into magnetite ($Fe_3O_4$), releasing carbon dioxide ($CO_2$) in the process. Magnetite shows brownish or grayish color. The simplified reaction that occurs is shown below:

$$3Fe_2O_3+CO \rightarrow 2Fe_3O_4+CO_2$$

In case "step 1" and "step 3" are performed in separate equipments (for example, in a rotary kiln or a flash dryer, respectively) the solid fuel shall be blended with clay right after it has been heated and dried, as shown in Illustration 1. The amount of solid fuel added to the blend varies between 1-5% (weight fraction) according to the level of hematite contained in the raw material. Table I shows the necessary amount of solid fuel that shall be added to the blend as a function of hematite's concentration in the clay.

TABLE I

Addition of solid fuel according to hematite's content.

| Hematite ($Fe_2O_3$) content in raw material | Mass fraction of solid fuel in the blend(*) |
|---|---|
| <3% | Not applicable |
| 3-5% | 1.5% |
| 5-8% | 3.0% |
| 8-12% | 5.0% |

(*)These values are taken for a reference fuel with parameter (% $C_{fix}$ + % Volatile = 90%; Use the relation between the parameter (% $C_{fix}$ + % Volatile) of the reference fuel and the real fuel to correct the amount of fuel to be blended with clay.

In case "heating" and "calcining" steps are performed in the same equipment, the solid fuel shall be added before "step 1" in order to heat and dry at the same time as the raw material. This process is shown in Illustration 2.

To maximize color change results, one shall keep the internal atmosphere of the kiln with very low concentration of oxygen (between 1-5%). One way to achieve this reducing atmosphere is through the burnout of solid, liquid or gaseous fuels (which are fed in "step 2") with a very small excess of air.

An equipment that is able to promote suitable combustion of many types of fuels (solid and liquid), especially in the critical conditions determined in the present invention, is a compact combustion pre-chamber, as described in the document BRPI 1000417-3, that is used as a reference. This equipment is capable to burn solid and liquid fuels in a low excess air condition (oxygen content between 1-5%). But the results of the present invention can also be achieved using other similar equipment.

Pozzolan average temperature shall not exceed 900° C., which is the temperature of formation of mullite, a stable crystalline structure that has no activation property as pozzolan does. To keep the right temperature range of the process, one shall limit the temperature of gases. One way to do that without the dilution with air, which means to keep low oxygen concentration, is by recirculation of the system exhaust gases. In other words, combustion takes place with small excess of oxygen and the temperature control of the process is also performed with low oxygen gases (and not fresh air, as usually). This way the whole process inside the kiln is performed with low oxygen availability, which contributes for the effective change in the product color.

In the following step ("step 4") pozzolan that was generated in the kiln and had the color modified will now enter a cooling process. The present invention can be applied for different types of cooler: a rotating cooler, a fluidized bed cooler or a flash cooler.

During cooling process special care shall be taken in order not to revert the color change that took place inside the kiln, otherwise the product color may turn back into reddish.

For the reason explained above, a mandatory characteristic of the present invention is that the cooling process shall be performed in two steps: an initial step that decreases pozzolan temperature rapidly to 600° C. and a final step that takes pozzolan temperature until 120° C. The present invention suggests that the first cooling step may have the heat exchange coefficient increased through the indirect use of water (for example, by keeping the external side of the drum wet in a rotary or flash cooler, or by the use of a water serpentine in a fluidized bed cooler). The second cooling step, on the other hand, shall be performed with the use of air or a low oxygen gas stream (from recirculation gases). The need to use water, as well as a low oxygen gas stream, depends on the content of hematite found in the raw material. The inventors defined ranges for the application of each cooling method (direct use of ambient air; indirect use of water; direct use of recirculated low oxygen gases). Table II relates the cooling methods applied according to hematite concentration in the raw material. It can be verified from the Table that there is an increase in sophistication of the cooling process as the hematite concentration of the raw material increases too. This is explained because color reversion is faster and more intense as the hematite concentration of the hot pozzolan and the oxygen concentration of the cooling process are higher.

TABLE II

Refrigeration conditions according to the hematite concentration in the raw material.

| Hematite concentration ($Fe_2O_3$) in the raw material | Cooling Technique |
| --- | --- |
| <3% | Direct use of ambient air |
| 3-6% | Direct use of recirculated gases |
| 6-10% | Direct use of ambient air and indirect use of water |
| >10% | Direct use of recirculated gases and indirect use of water |

Artificial pozzolan generated through the method described herein meets the following standards:
NBR 5736 Pozzolanic Portland Cement
NBR 5737 Sulfate Resistant Portland Cement
NBR 12653 Pozzolanic Material
NBR 5751 Pozzolanic Material—Determination of the pozzolanic activity—pozzolanic activity index with lime
NBR 5752 Pozzolanic material—Determination of the pozzolanic activity with cement
NBR 5753 Portland Cement—Pozzolanic activity test for Pozzolanic Portland Cement The techniques known until the present time to produce artificial active pozzolan have five important differences from the technique developed by Dynamis:
(1) Direct application of liquid fuel over the hot material during the cooling process, in order to allow the desired color change; and/or
(2) Use of solid fuels during "calcining" step, in order to keep a reducing atmosphere inside the kiln, allowing the emission of carbon monoxide with the process exhaust gases; and/or
(3) Direct application of water over the hot material during the cooling process; and/or
(4) No generation of grayish pozzolan; and/or
(5) No control over the final color of pozzolan.

The invention claimed is:

1. Manufacturing process of pozzolan with color change, comprising the following steps:
    Heating (1): consists of heating a raw material blend to a temperature between 100-350° C. until the material is dried to a range of moisture between 0-5% (wet basis);
    Mixture (2): consists of mixing dry raw materials that came from the heating step, with 1-5% of fuel mass fraction according to a hematite concentration of the raw material;
    Calcining (3): consists of heating a blend of fuel with the dry raw materials to a temperature between 700-900° C., with oxygen concentration between 1-5%; and
    Cooling (4): consists of an initial step with fast decrease in temperature to 600° C. and a final step with pozzolan temperature decrease to 120° C.

2. A process, according to claim 1, characterized by the mixture step (2) preceding the heating step (1), the heating step consisting of heating a blend of the raw materials and solid fuel from the mixture step (2) to a temperature between 100-350° C. until drying of the blend to a moisture mass fraction of 0-5% (wet basis).

3. A process, according to claim 1, characterized by the fact that the fuel is a solid selected from the following:
    mineral coal, charcoal, petroleum coke, pulverized coal, biomass or a carbon rich waste.

4. A process, according to claim 1, characterized by the fact that during the mixture step (2) an amount of solid fuel added is about 0% for a hematite concentration below 3% in the raw material composition; about 1.5% for a hematite concentration between 3-5% in the raw material composition; about 3% for a hematite concentration between 5-8% in the raw material composition; and about 5% for a hematite concentration between 8-12% in the raw material composition.

5. A process, according to claim 1, characterized by the fact that the calcining step (3) makes use of low oxygen recirculated gases from exhaust.

6. A process, according to claim 1, characterized by the fact that during the calcining step (3) a combustion of solid, liquid or gaseous fuel takes place inside a compact combustion pre-chamber.

7. A process, according to claim 1, characterized by the fact that a calcining equipment is selected from:
    rotating kiln or fluidized bed or flash calciner.

8. A process, according to claim 1, characterized by the fact that the cooling (4) takes place in a cooler selected from: rotary cooler or fluidized bed or flash cooler.

9. A process, according to claim 8, characterized by the fact that the cooling (4) comprises keeping the external side of the drum wet, in case of a rotary or flash cooler, or by the use of a water serpentine, in case of a fluidized bed.

10. A process, according to claim 1, characterized by the fact that the cooling (4) comprises a second step that is selected according to the concentration of hematite in the raw material.

11. A process, according to claim 10, characterized by the fact that the second step of the cooling (4) comprises:

Direct use of ambient air, for a concentration of hematite below 3%;

Direct use of recirculated gases, for a concentration of hematite between 3-6%;

Direct use of ambient air combined with indirect use of water, for a concentration of hematite between 6-10%; or Direct use of recirculated gases combined with indirect use of water, for a concentration of hematite above 10%.

\* \* \* \* \*